(12) United States Patent
Serizawa et al.

(10) Patent No.: US 10,783,902 B1
(45) Date of Patent: Sep. 22, 2020

(54) ADAPTIVE ACOUSTIC SENSING METHOD AND SYSTEM

(71) Applicant: Hitachi, Ltd., Chiyoda-ku, Tokyo (JP)

(72) Inventors: Yasutaka Serizawa, Cupertino, CA (US); Yusuke Shomura, Los Gatos, CA (US); Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/388,678

(22) Filed: Apr. 18, 2019

(51) Int. Cl.
*G10L 25/51* (2013.01)

(52) U.S. Cl.
CPC .................................. *G10L 25/51* (2013.01)

(58) Field of Classification Search
None
See application file for complete search history.

(56) References Cited

U.S. PATENT DOCUMENTS

| 9,541,912 B1 * | 1/2017 | Grossman, IV ....... G05B 19/02 |
| 2016/0091398 A1 * | 3/2016 | Pluemer ............. G05B 19/4065 702/183 |
| 2016/0316293 A1 * | 10/2016 | Klimanis ............ H04L 12/2823 |

* cited by examiner

*Primary Examiner* — James K Mooney
(74) *Attorney, Agent, or Firm* — Procopio, Cory, Hargreaves & Savitch LLP

(57) ABSTRACT

Systems and methods involving integrating camera and acoustic sensor data, and automatically capturing the acoustic sensor heatmap for the holistic sensing systems in Internet of Things (IoT) systems. In particular, example implementations described herein capture the local sound noise environment or localized noise profiles (e.g., noise fingerprint) adaptively to the change of noise profiles and automatically apply captured noise profiles to the streaming noise reduction in signal processing for industrial IoT areas.

18 Claims, 11 Drawing Sheets

Deployment of microphones in factory shop floor

| Time of Operation | Machine | State |
|---|---|---|
| T1-T2 | Machine1 | State A |
| T1-T2 | Machine2 | StateB |
| T2-T3 | Machine1 | StateC |
| ... | ... | ... |

FIG. 11

ADAPTIVE ACOUSTIC SENSING METHOD AND SYSTEM

BACKGROUND

Field

The present disclosure is related to Internet of Things (IoT) systems, and more specifically, to deployment of adaptive acoustic sensing in industrial IoT areas.

Related Art

For industrial IoT areas such as smart manufacturing areas, there are several requirements that have been an area of focus for improvement. Such requirements include increasing productivity, having systems in place to quickly determine the next intention or action in a process (e.g., at executive level, at shop floor level), increasing the added value of products or services, and increasing the return on asset (ROA).

To address the requirements, various IoT solutions have been generally considered and deployed, such as shop floor visualization, predictive/preventive maintenance, dynamic scheduling, product lifecycle management (PLM) collaboration, End to End (E2E) value chain collaboration, and so on.

Increasing productivity can be an essential and fundamental requirement which is common in the industrial IoT area. Various verifications have been done to determine how to increase productivity on a factory shop floor, though holistic sensing methods as well as specific sensing methods. In the related art, holistic sensing is one of the sensing categories in which non-contact or non-localized type sensors (such as cameras, acoustic sensors) are utilized to detect something, and specific sensing is another sensing category in which contact or localized type sensors (e.g., such as temperature/humidity sensors, vibration sensors, proximity sensors, Radio Frequency Identifiers (RFIDs)) are utilized. The two types of sensing methods are mutually complementary. The shop floor of the industrial factory is so wide, so as a first step the holistic sensing method can be effective to detect abnormal situations, machines, and humans, and then the specific sensing method facilitates closer investigation of the essential causality in detail. Such a sensing process or drilldown process provides information for reducing downtime of production, which leads to increasing productivity.

In holistic sensing methods, monitoring systems using cameras have been widely developed, which facilitates various applications such as production line failure monitoring, operator flow line analysis, product quality check, and so on. However, the camera image information is not always enough for such applications. Thus, in related art implementations, microphones or other acoustic sensors are increasingly focused on with an expectation to complement the camera data.

However, one of the issues for deploying acoustic sensors in an actual field site, such as a factory shop floor, is the existence of larger noise from multiple machines. Conventionally, many noise reduction or cancellation methods such as beamforming, auto encoder, noise cancellation with machine learning, and so on have been proposed in the related art to overcome this issue. However, in the actual factory shop floor, the noise from multiple machines are not uniform, but change in time series, which means that some noises intermittently appear/disappear, and others change their frequency profiles.

SUMMARY

Related art noise reduction methods cannot address the non-uniformity of noise sensed, and they further require localized parameter settings depending on the place where acoustic sensors are installed which complicates the installation. To overcome these problems, example implementations are directed to systems and methods to capture the local sound noise environment or localized noise profiles (noise fingerprint) adaptively based on the change of the noise profiles and automatically apply captured noise profiles to the streaming noise reduction in signal processing.

Through utilization of the example implementations, automatic and adaptive local sound-noise reduction enhance the quality of acoustic data for better analysis. Further, example implementations facilitate high usability such that users should only deploy acoustic sensor system in factory shop floor, thereby eliminating the need to do trial and error installations for localized parameter settings.

BRIEF DESCRIPTION OF DRAWINGS

FIG. 11 illustrates an example operation schedule, in accordance with an example implementation.

DETAILED DESCRIPTION

Figure 1:
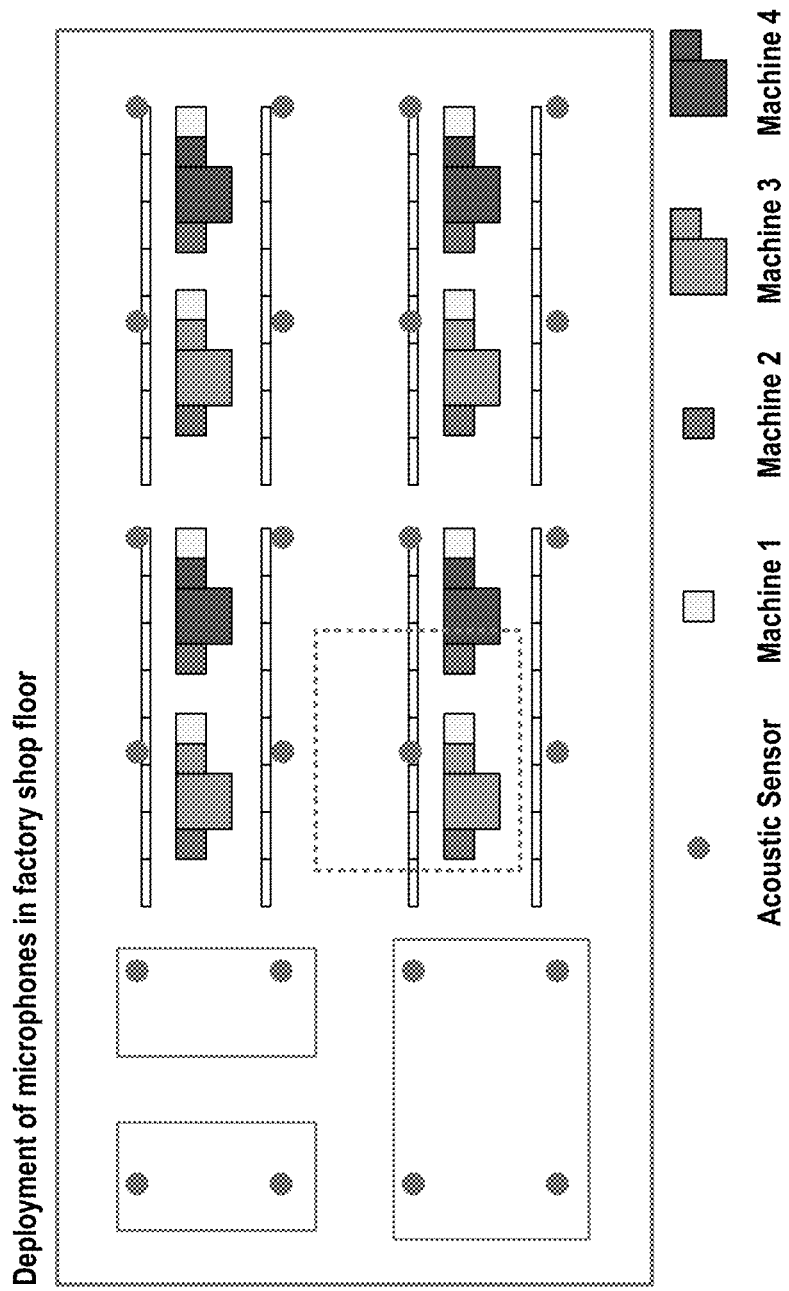
FIG. 1 illustrates an example of deployment of acoustic sensors in factory shop floor, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are generally directed to the automatic reduction of localized noises in acoustic sensing systems. In particular, example implementations provide the way to capture the local sound noise environment or localized noise profiles (noise fingerprint) adaptively based on the change of noise profiles and automatically apply captured noise profiles to the streaming noise reduction in signal processing for an industrial IoT area. Here "localized noise profiles (=noise fingerprint)" is defined as individual sound waveform from each sound source without any other noise sources. Example implementations involve systems and methods that provide totally automatic localized-noise reduction method for factory use cases. In an example implementation described below, the method and system are configured to reduce the manual operation of local tuning depending on local noise profiles as much as possible, which facilitates the capture of better quality of acoustic signals and investigation of the shop floor and the states of a specific machine in detail with acoustic sensors.

FIG. 1 illustrates an example of deployment of acoustic sensors in factory shop floor, in accordance with an example implementation. In order to cover an entire shop floor, acoustic sensors are arranged in a grid like manner as illustrated in the example of FIG. 1. The ways (separation, arrangement, and position) to deploy acoustic sensors are dependent on the characteristics of the acoustic sensors as well as user preference (e.g., which area users want to monitor).

Figure 2:
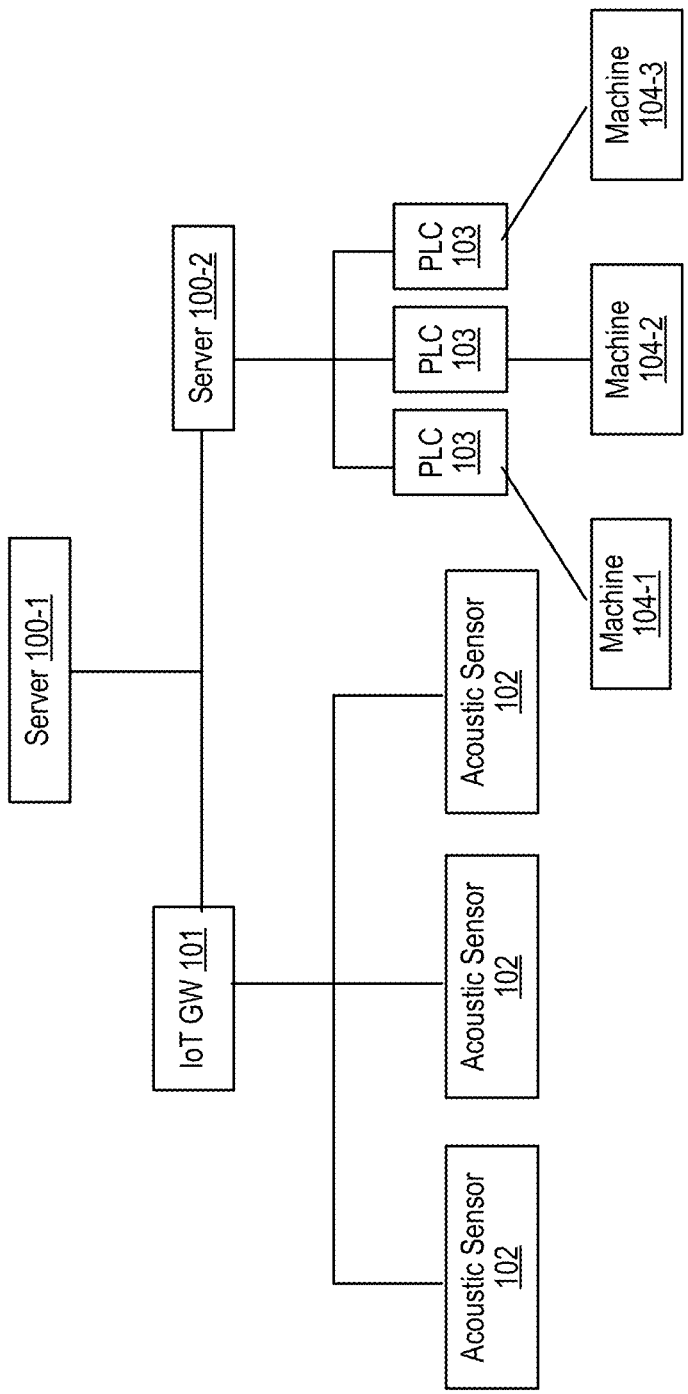
FIG. 2 illustrates an example system architecture of an acoustic sensing system and a control system in a factory, in accordance with an example implementation.

FIG. 2 illustrates an example system architecture of an acoustic sensing system and a control system in a factory, in accordance with an example implementation. In this example system architecture, IoT gateway (GW) 101 controls data gathering from one or more acoustic sensors 102 synchronously, and server 100-2 organizes one or more Programmable Logic Controllers (PLCs) 103 connected with each corresponding machine 104-1, 104-2, 104-3. Server 100-2 can not only control the behavior of each machine 104-1, 104-2, 104-3, but also collect data regarding to the state of each machine synchronously. Therefore, in the example system illustrated in FIG. 2, server 100-1 obtains synchronous data of acoustic sensors (time series wave forms) and the state of each machine.

Figure 3:
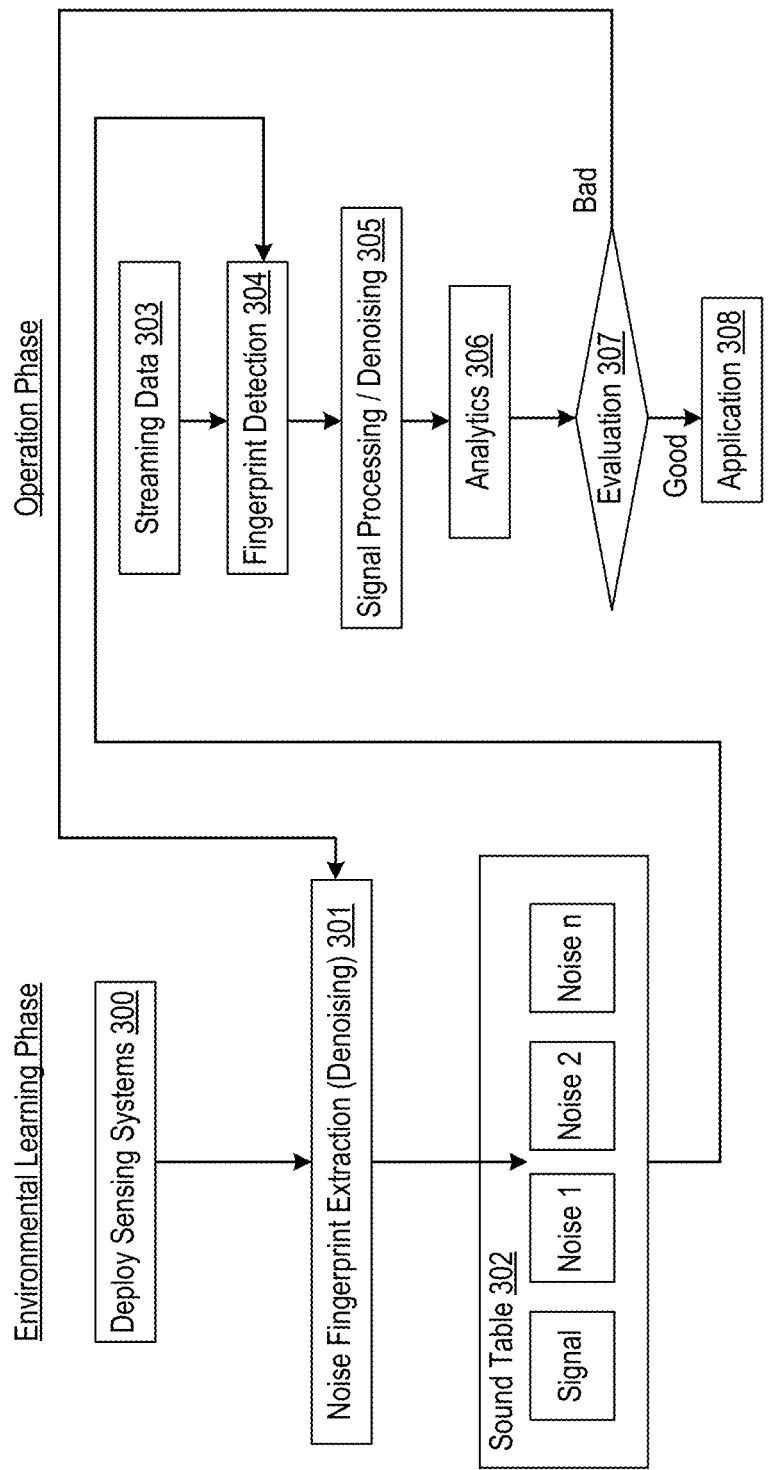
FIG. 3 shows the overall procedure of the way to capture the local sound noise environment or localized noise profiles (noise fingerprint) adaptively based on the change of the noise profiles and automatically apply captured noise profiles to the streaming noise reduction in signal processing, in accordance with an example implementation.

FIG. 3 shows the overall procedure of the way to capture the local sound noise environment or localized noise profiles (noise fingerprint) adaptively based on the change of noise profiles and automatically apply captured noise profiles to the streaming noise reduction in signal processing, in accordance with an example implementation. Here "localized noise profiles (=noise fingerprint)" is defined as individual sound waveform from each sound source without any other noise sources. This procedure can be divided into two phases which are mutually related. The first phase is the environmental leaning phase, and the other phase is the operation phase.

In the environmental leaning phase, after users deploy the sensing systems including the acoustic sensors and servers according to desired implementation at 300, noise fingerprints (e.g., noise profiles which are identified sound waveforms of individual sound source without any other sound sources) in the local environment that correspond to the acoustic coverage area of each acoustic sensor are extracted to generate sound table 302. The sound table 302 is a collection of relationships between noise/signal patterns (e.g., wave forms) and noise/signal labels (e.g., meaning or explanation of the noise). Further details of the environmental learning phase are provided with respect to FIG. 4.

Once noise fingerprints are collected, the system enters into the operation phase. In the operation phase, the streaming acoustic data 303 is processed in server 100-1. At first, fingerprint detection 304 is performed by using the sound table 302 obtained during the environmental learning phase. In fingerprint detection 304, streaming acoustic data, which is typically a tiny portion of entire waveform (e.g. 1024 points of waveform which corresponds to ~0.1 s @10 kHz sampling), is processed to identify which noise corresponds to the waveform.

Once the streaming acoustic data is identified, the ID information is used to reduce noise in the signal processing/denoising section at 305. In example implementations, the noise can be removed because the noise pattern was learned and obtained in the environmental learning phase. For example, auto encoder technology or adaptive noise filters can be utilized to remove such noise based on the learned noise pattern. Then, the denoised signal can be input into analytics processing at 306 (e.g., statistical analysis, machine learning for classification, and so on), which can generate an evaluation result of the signal quality as one of the outputs. If the evaluation result is good (e.g., the signal quality meets a preset threshold), the result of the analysis can be transferred to corresponding applications for facilitating various processes at 308. If the result is bad (e.g., the signal quality does not meet the preset threshold), the flow proceeds back to 301 wherein the unknown noise is included in the streaming signal and provided back to the environmental learning phase to add to the sound table. Further details of the operation phase are provided with respect to FIG. 8.

Figure 4:
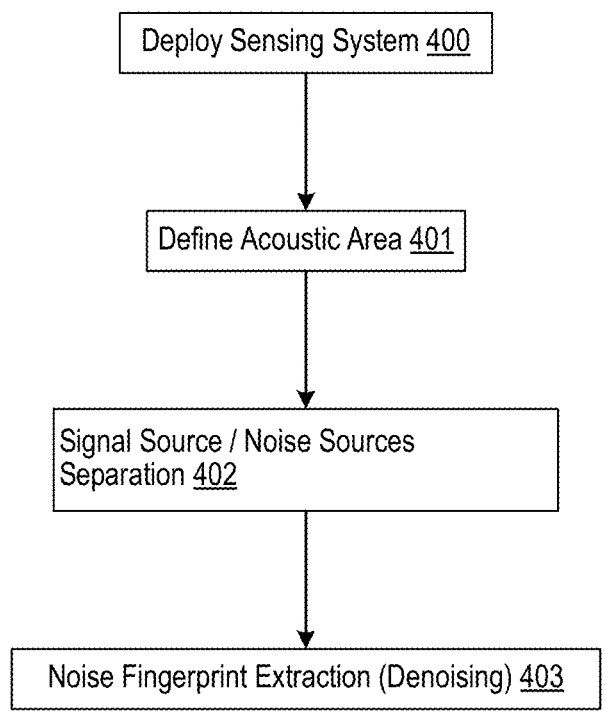
FIG. 4 illustrates a detailed flow for the environmental learning phase, in accordance with an example implementation.
Figure 5:
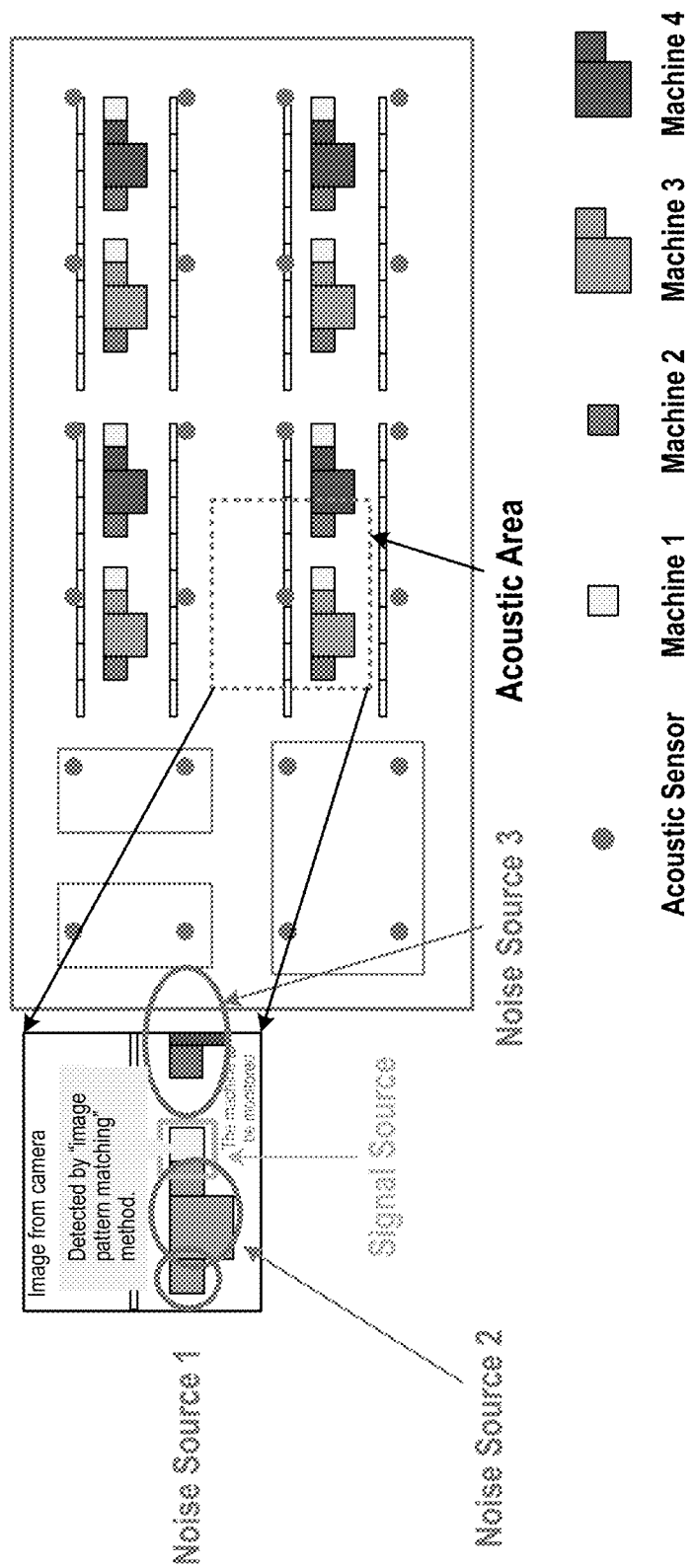
FIG. 5 illustrates an example definition of the acoustic area and signal/noise sources, in accordance with an example implementation.

FIG. 4 illustrates a detailed flow for the environmental learning phase, in accordance with an example implementation. This procedure is explained here in detail with respect to FIGS. 5-7. After deploying the sensing system including acoustic sensors and servers according to the desired implementation at 400, the acoustic area is then defined at 401. FIG. 5 illustrates an example definition of the acoustic area and signal/noise sources, in accordance with an example implementation. In this example, acoustic area is determined by the guideline of acoustic range (e.g. distance of ~20-30 m) in which sound can arrive at the acoustic sensor from a sound source. Signal sources (i.e., sound sources to be monitored) and noises are distinguished using image detection technology (e.g., image pattern matching with machine learning) with a camera installed in the same position as the acoustic sensors. In FIG. 5, once the acoustic area is determined, the signal source (machine 1) and noise source (machine 2 and 3) can be distinguished and identified logically.

Figure 6:
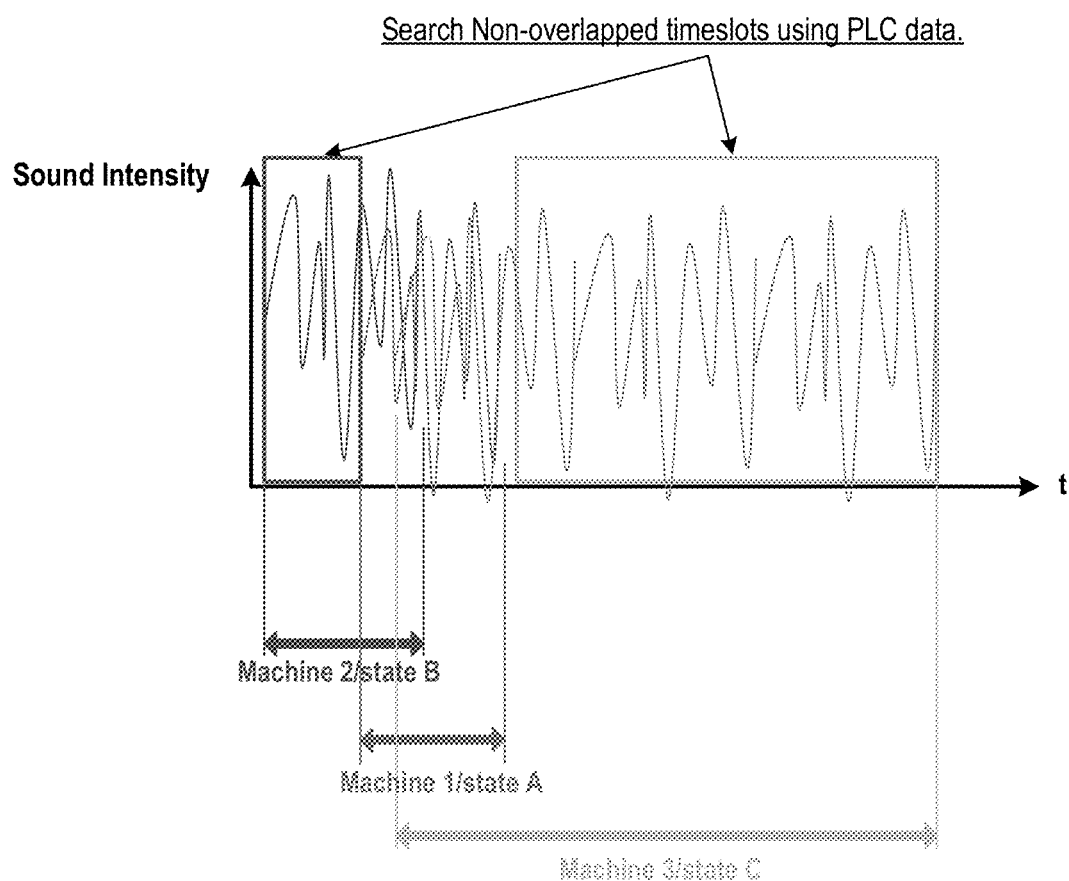
FIG. 6 illustrates an example of separation of signal and noise in time series, in accordance with an example implementation.

Subsequently, the signal and noise can be separated in a time series waveform as shown in FIG. 6. FIG. 6 illustrates an example of separation of signal and noise in time series, in accordance with an example implementation. Specifically, FIG. 6 illustrates examples of sound signatures involving a mixture of waveforms due to the operation of overlapping machines, as well as sound signatures obtained when only a singular machine is operating in isolation. In FIG. 6, an example of a waveform mixture of signal (machine 1/state A) and noise (machine 2/state B, and machine 3/state C) is shown. PLCs which are connected to each machine can provide synchronous information of the state of each machine in a time series manner, which helps to identify time slots of acoustic waveforms which correspond to the states of each machine. In this way, the mixture of waveform can be categorized into time slots which correspond to the states of each machine. Using this categorization, the example implementations described herein then search non-overlapped time slots with the other states of each of the machines. In FIG. 6, as for machine 2/state B and machine 3/state C, there are portions of non-overlapped time slots. On the other hand, as for machine 1/state A, there are no non-overlapping time slots, as they are all overlapped. However, the overlapped waveform of machine 1/state A can be separated by using the noise patterns of machine 2/state B and machine 3/state C. Therefore, the mixture of signal and noise can be separated using the waveform of non-overlapped time slots provided by PLCs information and then through waveform subtraction. As illustrated in FIG. 6, the sound signatures are detected by the acoustic sensors in the form of periodic digital signals as machines operating on a factory floor tend to emit the same sounds in a periodic manner.

Figure 7:
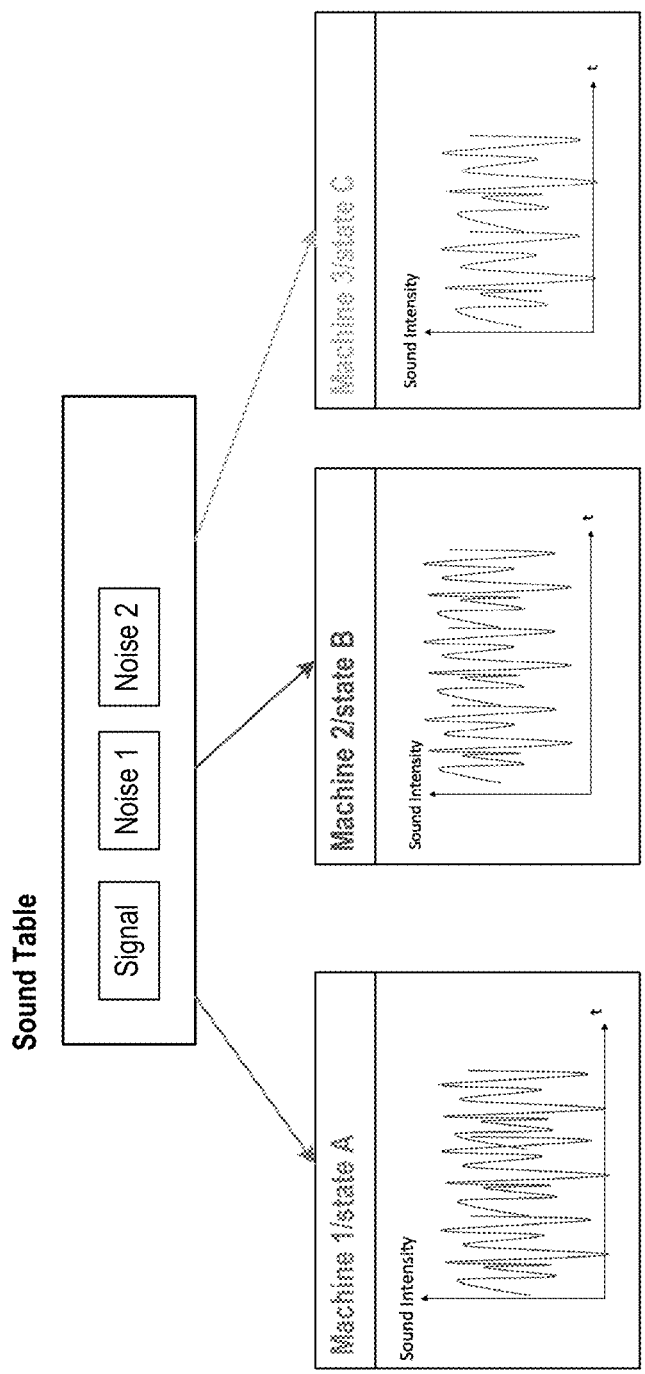
FIG. 7 illustrates an example of the sound table with separated signal and noise patterns, in accordance with an example implementation.

FIG. 7 illustrates an example of the sound table with separated signal and noise patterns, in accordance with an example implementation. In FIG. 7, the separated signal/noise patterns are profiled as a sound table, which involves specific waveforms and their labels. The waveforms and labels are stored as sound segments as reference for a machine operating under a particular state as illustrated in FIG. 7. The labels indicate the machine emitting the specific sound waveform, as well as the state of the machine during the period the waveform was generated.

Figure 8:
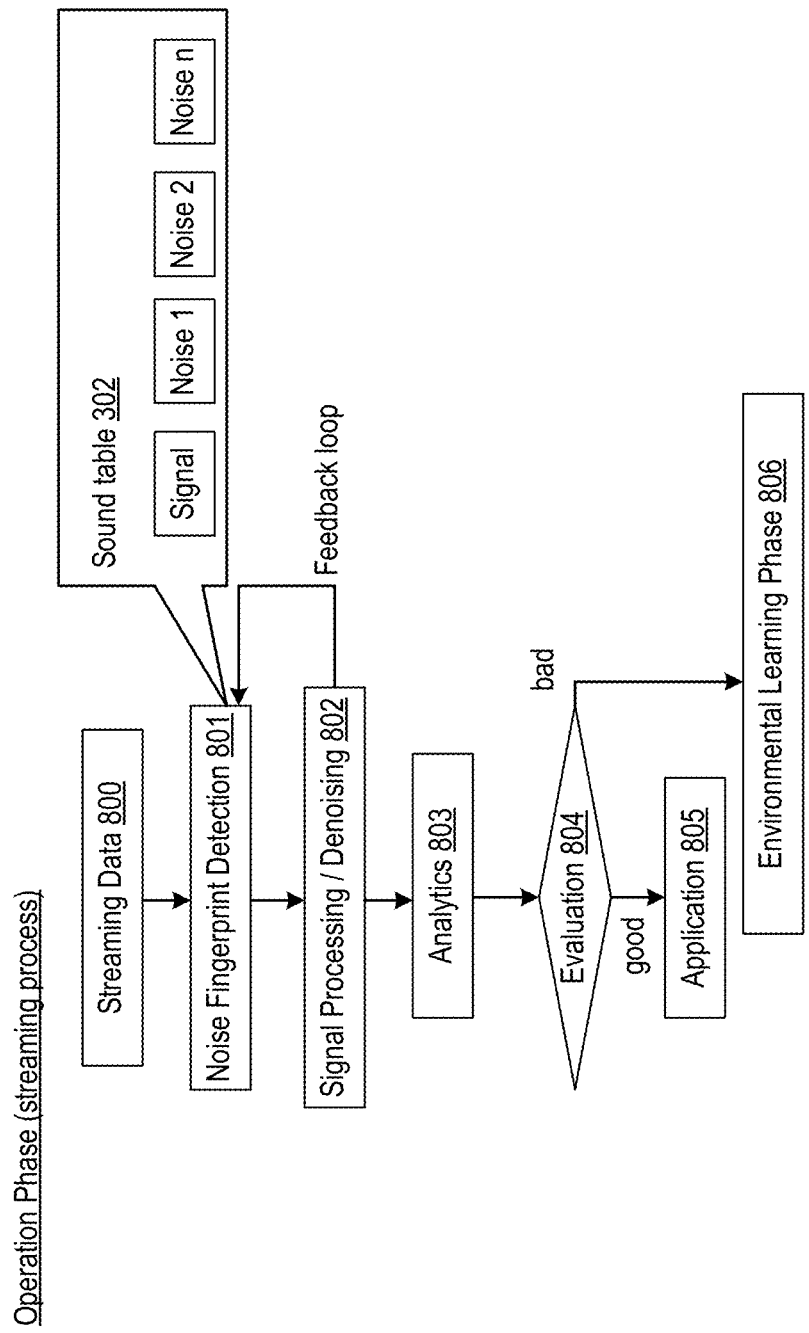
FIG. 8 illustrates an example flow of the operation phase, in accordance with an example implementation.

FIG. 8 illustrates an example flow of the operation phase, in accordance with an example implementation. This procedure is explained here in detail based on the example provided in FIG. 9. In the operation phase, streaming acoustic data 800 is processed by the server 100-1. At first, noise fingerprint detection 801 is performed using the sound table 302 which was obtained in the environmental learning phase as illustrated in FIG. 4. In fingerprint detection 801, streaming acoustic data which is typically a tiny portion of entire waveform (e.g. 1024 points of waveform which corresponds to ~0.1 s @10 kHz sampling) are investigated in order to categorize the noise based on the sound table. Here, since the fingerprint of signal in which users are interested is known, the noise fingerprints other than the signal can be utilized as mother data for noise reduction. An example implementation is that the maximum self-correlation value with the waveform of fingerprint of the signal from the sound table and extracted streaming waveform after noise reduction with any combination of the noise fingerprints other than the signal. Once the noise fingerprint is detected and categorized as one of the noises in sound table, the information is transferred to signal processing/denoising section 802, where according to the information (categorized noise) noise filters are established to reduce the corresponding noise through waveform subtraction, by using noise filtering technology such as auto encoder, adaptive noise filters, machine learning and so on in accordance with the desired implementation. This process also has a feedback loop to categorize the noise fingerprint and apply the results to signal processing/denoising continuously. Then, the denoised signal can be input into analytics processing at 803 (e.g., statistical analysis, machine learning for classification, and so on), which can generate an evaluation result of the signal quality as one of the outputs. If the evaluation result is good (e.g., the signal quality meets a preset threshold), the result of the analysis can be transferred to corresponding applications for facilitating various processes at 805. If the result is bad (e.g., the signal quality does not meet the preset threshold), the flow proceeds to 806 to re-execute the environmental learning phase wherein the unknown noise is included in the streaming signal and provided back to the environmental learning phase to add to the sound table.

Figure 9:
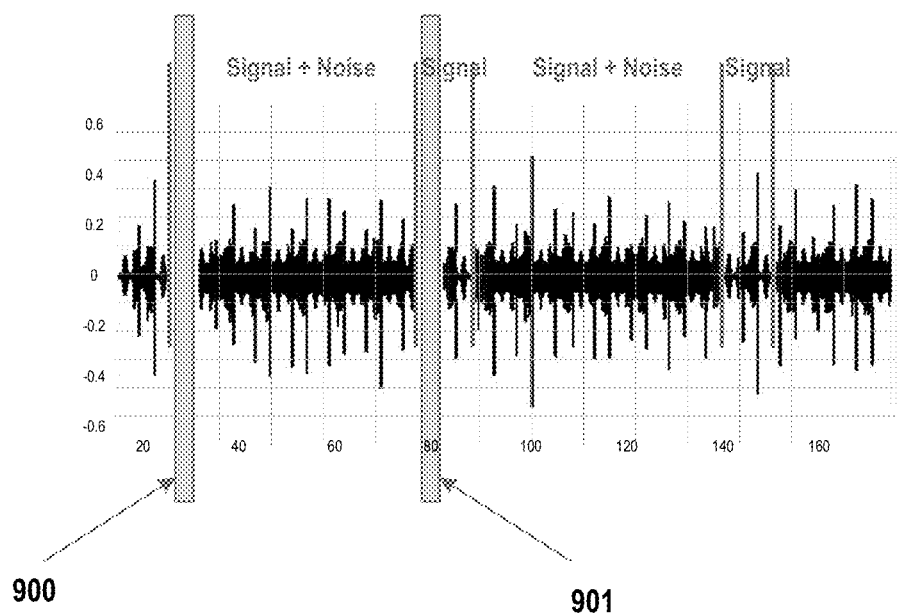
FIG. 9 illustrates an example for conducting noise fingerprint detection and signal processing/denoising including a feedback loop by using sample time series data, in accordance with an example implementation.

FIG. 9 illustrates an example for conducting noise fingerprint detection and signal processing/denoising including a feedback loop by using sample time series data, in accordance with an example implementation. In the example illustrated in FIG. 9, noise is detected in the tiny time slots as an event of noise addition as shown at 900, which becomes a trigger to apply noise filtering using a noise fingerprint in sound table. While the noise fingerprint is detected from the feedback loop, the noise filter is applied. Then, when the noise fingerprint is not detected as a result of event detection of noise disappearance (e.g., at time slot 901), the application of the noise filter is stopped. The adaptivity to time series changes of noise appearance can be realized through the implementation as illustrated in FIG. 9. Accordingly, the local/site-specific noise can be removed automatically and adaptively to time series changes of environment.

Figure 10:
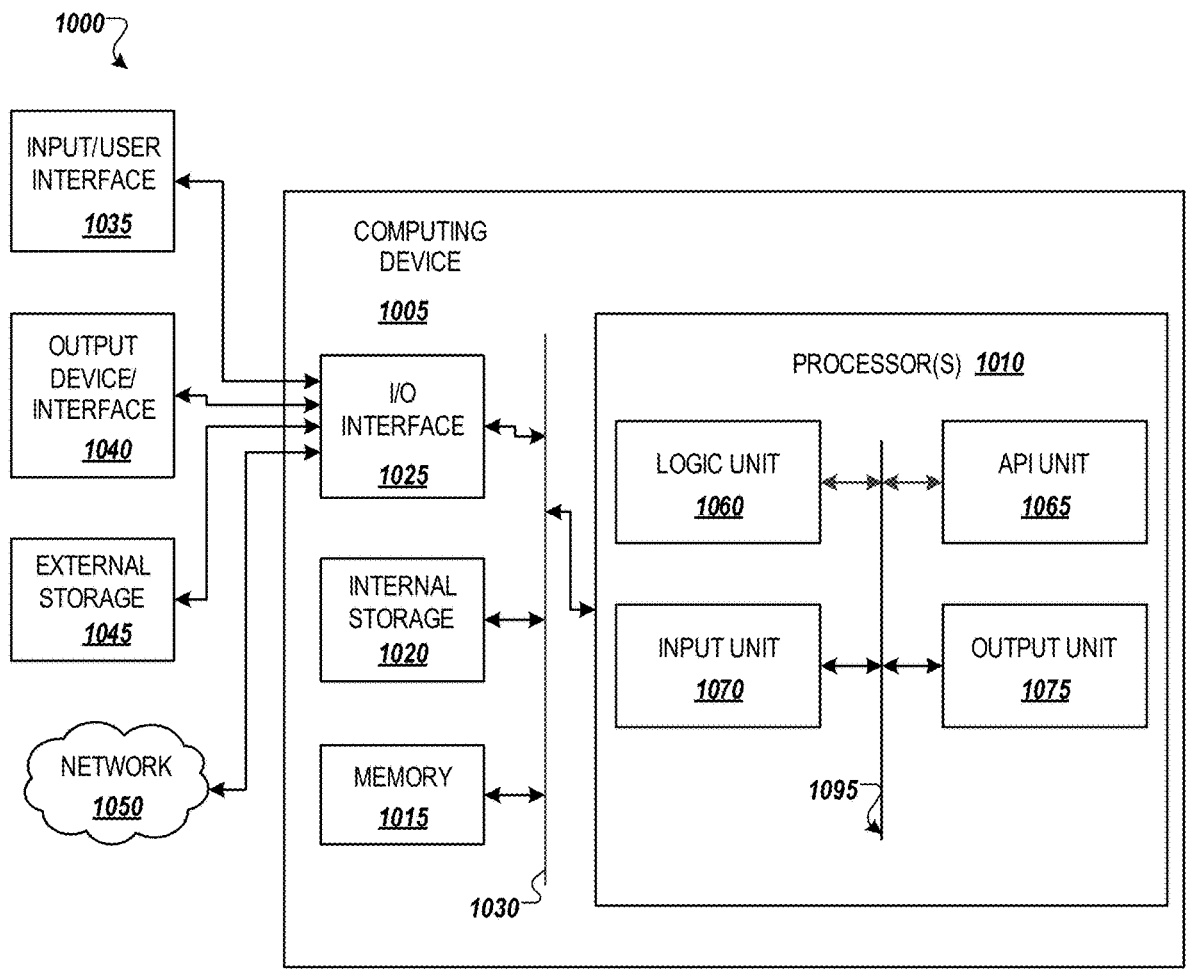
FIG. 10 illustrates an example computing environment with an example computer device suitable for use in example implementations.

FIG. 10 illustrates an example computing environment with an example computer device suitable for use in example implementations. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005. In example implementations involving a touch screen display, a television display, or any other form of display, the display is configured to provide a user interface.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Memory 1015 may be configured to manage sound table 302 as illustrated in FIG. 7, as well as an operation schedule for a plurality of machines on a factory floor as illustrated in FIG. 11 for conducting the processes of the example implementations as described herein.

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of physical processors or central processing units (CPU) that is configured to execute instructions loaded from Memory 1015.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to construct the sound segments for the plurality of machines as illustrated in FIG. 7 for the sound table, by obtaining sound signatures from the plurality of acoustic sensors for ones of the plurality of machines operating by itself during periods of time that the ones of the plurality of machines are operating by itself as indicated by the operation schedule; associating the sound signatures to ones of the plurality of machines and an operation state as the sound segments for the ones of the plurality of machines; obtaining second sound signatures from the sensors during periods of the multiple ones of the machines are in operation; and processing the second sound signatures based on the associated signatures to derive sound signatures for overlapped ones of the plurality of machines as the sound segments for the overlapped ones of the plurality of machines as illustrated in FIGS. 4 and 6 for the execution of the environmental learning phase. As illustrated in FIG. 6, such sound signatures can involve periodic digital signals received from the plurality of acoustic sensors.

Processor(s) 1010 can be configured to execute the flow for the operation phase as illustrated in FIG. 8 and receive streaming sound signatures from the plurality of acoustic sensors. For conducting analytics on a machine from the plurality of machines, the processor(s) 1010 can be configured to detect other ones of the plurality of machines based on comparing the sound segments to the streaming sound signatures; filter out the detected other ones of the plurality of the machines from the received streaming sound signatures; and conduct the analytics on the filtered streaming sound signatures.

For an evaluation of the analytics indicative of a signal quality of the filtered streaming sound signatures as not meeting a threshold as illustrated in FIG. 8, processor(s) 1010 can be configured to re-execute the environmental learning phase and associate the filtered streaming sound signature as having an unknown noise for the machine from the plurality of machines in the sound table 302. The noise can later be filtered out during the environmental learning phase when the sound signature for the particular machine can be isolated out and the waveform subtracted from the stored noise, thereby leaving the unknown noise in the sound table 302 in isolation. Thus, the sound table 302 can be updated dynamically to store incidents of unknown noises that occur on the factory floor and isolate such sound signatures to construct a sound segment specific to that noise.

As illustrated in FIG. 1, the streaming sound signatures can be from the plurality of acoustic sensors through an Internet of Things (IoT) gateway managing the plurality of acoustic sensors on a factory floor. Further, the operation schedule as illustrated in FIG. 11 can be received a server managing the plurality of machines on a factory floor through a plurality of programmable logic controllers (PLCs).

Processor(s) 1010 are also configured to determine an acoustic area based on the range of the acoustic sensors and then associate each area with one or more machines and one or more cameras. In such example implementations, when a sound signature is identified, the sound signature can be paired with a camera image from one or more cameras deployed on the factory floor and the machine can be highlighted and labeled as the source of the sound signature as illustrated in FIG. 5.

FIG. 11 illustrates an example operation schedule, in accordance with an example implementation. Specifically, FIG. 11 includes the time of operation for a particular machine, the machine in operation and the state that the machine is operating under during the time of operation. Through this operation schedule as illustrated in FIG. 11, the server therefore is informed of what machines are operating under what state during specific periods of time in order to correctly create the sound table according to the example implementations described herein.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   constructing sound segments for a plurality of machines, the constructing comprising:
   obtaining an operation schedule for each of the plurality of machines;
   obtaining first sound signatures from a plurality of acoustic sensors for a first subset of the plurality of machines operating by themselves during periods of time that the first subset of the plurality of machines are operating by themselves as indicated by the operation schedule;
   associating the first sound signatures to the first subset of the plurality of machines and an operation state as the sound segments for the first subset of the plurality of machines;
   obtaining second sound signatures from the plurality of acoustic sensors during periods of time that a second subset of the plurality of machines are in operation, the second subset comprising more than one of the plurality of machines and also involving at least one machine from the plurality of machines that is overlapped by one or more other ones of the plurality of machines in operation during the periods of time;
   processing the second sound signatures based on the associated signatures to derive third sound signatures for the at least one machine from the plurality of machines that is overlapped as the sound segments for the at least one machine from the plurality of machines that is overlapped.

2. The method of claim 1, wherein the first sound signatures comprise periodic digital signals received from the plurality of acoustic sensors.

3. The method of claim 1, further comprising:
   receiving streaming fourth sound signatures from the plurality of acoustic sensors;

for conducting analytics on a given machine from the plurality of machines:

detecting a fourth subset of the plurality of machines based on comparing the sound segments to the streaming fourth sound signatures, the fourth subset excluding the given machine from the plurality of machines;

filtering out the detected fourth subset of the plurality of the machines from the received streaming fourth sound signatures; and conducting the analytics on the filtered streaming fourth sound signatures.

4. The method of claim 3, wherein for an evaluation of the analytics indicative of a signal quality of the filtered streaming fourth sound signatures as not meeting a threshold, associating the filtered streaming fourth sound signatures as having an unknown noise for the machine from the plurality of machines.

5. The method of claim 3, wherein the receiving the streaming fourth sound signatures from the plurality of acoustic sensors is conducted through an Internet of Things (IoT) gateway managing the plurality of acoustic sensors on a factory floor.

6. The method of claim 1, wherein the obtaining the operation schedule for the each of the plurality of machines comprising obtaining the operation schedule from a server managing the plurality of machines on a factory floor through a plurality of programmable logic controllers (PLCs).

7. A non-transitory computer readable medium, storing instructions for executing a process, the instructions comprising:

constructing sound segments for a plurality of machines, the constructing comprising:

obtaining an operation schedule for each of the plurality of machines;

obtaining first sound signatures from a plurality of acoustic sensors for a first subset of the plurality of machines operating by themselves during periods of time that the first subset of the plurality of machines are operating by themselves as indicated by the operation schedule;

associating the first sound signatures to the first subset of the plurality of machines and an operation state as the sound segments for the first subset of the plurality of machines;

obtaining second sound signatures from the plurality of acoustic sensors during periods of time that a second subset of the plurality of machines are in operation, the second subset comprising more than one of the plurality of machines and also involving at least one machine from the plurality of machines that is overlapped by one or more other ones of the plurality of machines in operation during the periods of time;

processing the second sound signatures based on the associated signatures to derive third sound signatures for the at least one machine from the plurality of machines that is overlapped as the sound segments for the at least one machine from the plurality of machines that is overlapped.

8. The non-transitory computer readable medium of claim 7, wherein the first sound signatures comprise periodic digital signals received from the plurality of acoustic sensors.

9. The non-transitory computer readable medium of claim 7, the instructions further comprising:

receiving streaming fourth sound signatures from the plurality of acoustic sensors;

for conducting analytics on a given machine from the plurality of machines:

detecting a fourth subset of the plurality of machines based on comparing the sound segments to the streaming fourth sound signatures, the fourth subset excluding the given machine from the plurality of machines;

filtering out the detected fourth subset of the plurality of the machines from the received streaming fourth sound signatures; and conducting the analytics on the filtered streaming fourth sound signatures.

10. The non-transitory computer readable medium of claim 9, wherein for an evaluation of the analytics indicative of a signal quality of the filtered streaming fourth sound signatures as not meeting a threshold, associating the filtered streaming fourth sound signatures as having an unknown noise for the machine from the plurality of machines.

11. The non-transitory computer readable medium of claim 9, wherein the receiving streaming fourth sound signatures from the plurality of acoustic sensors is conducted through an Internet of Things (IoT) gateway managing the plurality of acoustic sensors on a factory floor.

12. The non-transitory computer readable medium of claim 7, wherein the obtaining the operation schedule for the each of the plurality of machines comprising obtaining the operation schedule from a server managing the plurality of machines on a factory floor through a plurality of programmable logic controllers (PLCs).

13. An apparatus communicatively coupled to a plurality of machines and a plurality of acoustic sensors, the apparatus comprising:

a memory configured to store an operation schedule for each of the plurality of machines; and a processor, configured to:

construct sound segments for the plurality of machines, by:

obtaining first sound signatures from a plurality of acoustic sensors for a first subset of the plurality of machines operating by themselves during periods of time that the first subset of the plurality of machines are operating by themselves as indicated by the operation schedule;

associating the first sound signatures to the first subset of the plurality of machines and an operation state as the sound segments for the first subset of the plurality of machines;

obtaining second sound signatures from the plurality of acoustic sensors during periods of time that a second subset of the plurality of machines are in operation, the second subset comprising more than one of the plurality of machines and also involving at least one machine from the plurality of machines that is overlapped by one or more other ones of the plurality of machines in operation during the periods of time;

processing the second sound signatures based on the associated signatures to derive third sound signatures for the at least one machine from the plurality of machines that is overlapped as the sound segments for the at least one machine from the plurality of machines that is overlapped.

14. The apparatus of claim 13, wherein the first sound signatures comprise periodic digital signals received from the plurality of acoustic sensors.

15. The apparatus of claim 13, the processor configured to:

receiving streaming fourth sound signatures from the plurality of acoustic sensors;

for conducting analytics on a given machine from the plurality of machines:

detect a fourth subset of the plurality of machines based on comparing the sound segments to the streaming fourth sound signatures, the fourth subset excluding the given machine from the plurality of machines;

filter out the detected fourth subset of the plurality of the machines from the received streaming fourth sound signatures; and conduct the analytics on the filtered streaming fourth sound signatures.

16. The apparatus of claim 15, wherein for an evaluation of the analytics indicative of a signal quality of the filtered streaming fourth sound signatures as not meeting a threshold, the processor is configured to associate the filtered streaming fourth sound signatures as having an unknown noise for the machine from the plurality of machines.

17. The apparatus of claim 15, wherein the apparatus is configured to receive streaming fourth sound signatures from the plurality of acoustic sensors through an Internet of Things (IoT) gateway managing the plurality of acoustic sensors on a factory floor.

18. The apparatus of claim 13, wherein the apparatus is configured to obtain the operation schedule for the each of the plurality of machines from a server managing the plurality of machines on a factory floor through a plurality of programmable logic controllers (PLCs).

* * * * *